United States Patent
Gaedke et al.

(10) Patent No.: US 8,619,862 B2
(45) Date of Patent: Dec. 31, 2013

(54) METHOD AND DEVICE FOR GENERATING AN IMAGE DATA STREAM, METHOD AND DEVICE FOR RECONSTRUCTING A CURRENT IMAGE FROM AN IMAGE DATA STREAM, IMAGE DATA STREAM AND STORAGE MEDIUM CARRYING AN IMAGE DATA STREAM

(75) Inventors: Klaus Gaedke, Hannover (DE); Arend Streit, Hannover (DE)

(73) Assignee: Thomson Licensing, Issy-les-Moulineaux (FR)

( * ) Notice: Subject to any disclaimer, the term of this patent is extended or adjusted under 35 U.S.C. 154(b) by 694 days.

(21) Appl. No.: 12/380,699

(22) Filed: Mar. 3, 2009

(65) Prior Publication Data
US 2009/0238282 A1 Sep. 24, 2009

(30) Foreign Application Priority Data
Mar. 18, 2008 (EP) .................................. 08102732

(51) Int. Cl.
*H04B 1/66* (2006.01)
*G06K 9/36* (2006.01)

(52) U.S. Cl.
USPC ...................................... 375/240.16; 382/236

(58) Field of Classification Search
USPC .......... 348/584, 585, 586, 587, 588, 589, 590, 348/591, 592, 169, 135, 390, 396, 391, 394, 348/395, 404, 409, 412, 402.1, 416.1, 609, 348/700; 382/103, 107, 218, 284, 209, 217, 382/199, 118, 291, 236, 238, 239; 375/240.16, 240.24, 240.12, 240.23, 375/240.01
See application file for complete search history.

(56) References Cited

U.S. PATENT DOCUMENTS 6,163,576 A 12/2000 Lempel
6,891,891 B2 * 5/2005 Pau et al. ................. 375/240.16
(Continued)

FOREIGN PATENT DOCUMENTS

CN 1756365 4/2006
EP 1 061 747 A1 10/2007
(Continued)

OTHER PUBLICATIONS

"Single Reference Fame Multiple Current Macroblocks Scheme for Multi-Frame Motion Estimation in H264/AVC" Tung-Chien Chen et al., 2005.
"Computation-aware Scheme for Software-based Block Motion Estimation" CHii-tung liu et al., 2003.
"Hardware Architecture for Global Motion Estimation for MPEG-4 Advanced Simple Profile" Ching-Yeh Chen et al., 2004.

*Primary Examiner* — Behrooz Senfi
(74) *Attorney, Agent, or Firm* — Myers Wolin, LLC (57) ABSTRACT

The invention is related to the generation of an image data stream and the reconstruction of an image from an image data stream.
The method for generating an image data stream comprises the steps of (a) assigning search regions in a reference image to source macro blocks of a current image; (b) determining in the search regions best matches and corresponding residuals and (c) encoding the determined residuals in a data stream. A further feature of the method is related to the fact that the processing order in at least one of the steps (b) and (c) depends on positions of the assigned search regions in the reference image.
The variation in the processing order allows for more efficient determination of best matches at encoder side and/or reduced processing requirements at decoder side.

10 Claims, 6 Drawing Sheets

(56) References Cited

U.S. PATENT DOCUMENTS

| | | | |
|---|---|---|---|
| 7,933,332 B2* | 4/2011 | Schu et al. | 375/240.16 |
| 8,009,923 B2* | 8/2011 | Li et al. | 382/236 |
| 2002/0163968 A1* | 11/2002 | Moschetti | 375/240.16 |
| 2002/0186772 A1* | 12/2002 | Li et al. | 375/240.18 |
| 2003/0076883 A1* | 4/2003 | Bottreau et al. | 375/240.12 |
| 2005/0207663 A1* | 9/2005 | Zeng et al. | 382/236 |
| 2006/0062305 A1* | 3/2006 | Lu et al. | 375/240.16 |
| 2006/0067399 A1 | 3/2006 | Zhang | |
| 2006/0245498 A1* | 11/2006 | Lee et al. | 375/240.16 |
| 2008/0075169 A1* | 3/2008 | Ugur et al. | 375/240.16 |
| 2008/0137741 A1* | 6/2008 | Kalva | 375/240.12 |
| 2009/0022223 A1* | 1/2009 | Gallant et al. | 375/240.14 |

FOREIGN PATENT DOCUMENTS

| | | |
|---|---|---|
| JP | 2004165803 | 6/2004 |
| JP | 2006217644 | 8/2006 |
| WO | WO 99/16352 | 4/1999 |
| WO | WO2006/100625 A1 | 9/2006 |

\* cited by examiner

METHOD AND DEVICE FOR GENERATING AN IMAGE DATA STREAM, METHOD AND DEVICE FOR RECONSTRUCTING A CURRENT IMAGE FROM AN IMAGE DATA STREAM, IMAGE DATA STREAM AND STORAGE MEDIUM CARRYING AN IMAGE DATA STREAM

This application claims the benefit, under 35 U.S.C. §119, of European Patent Application No. 08102732.8 filed 18 Mar. 2008.

FIELD OF THE INVENTION

The invention is related to the generation of an image data stream and the reconstruction of an image from an image data stream. More specifically, the invention is related to encoding of a current image by help of a reference image and to decoding of the encoded current image.

BACKGROUND OF THE INVENTION

Encoding techniques known in the art make use of information comprised in previously encoded reference images. This is done by searching for each source macro block of the current image a best matching reference macro block in the reference image such that a residual between the reference macro block and the source macro block is minimized. Then, the source macro block is encoded by help of the residual and of a motion vector indicating the spatial relationship between the source macro block and the best match reference macro block. The process of searching a best match reference macro block is also known as motion estimation.

As the best matching reference macro block might be located everywhere in the reference image, finding the best match reference macro block is a computationally expensive task.

A way to reduce the computational effort is hierarchical motion estimation.

Hierarchical Motion Estimation is based on the following ideas:

In a first step, the source image and the reference image are downscaled by pixel merging or subsampling.

During the next step, full motion estimation is performed for the downscaled images. Because the downscaled images consist only of a few macro blocks, it is not very computation intensive to calculate matches of each source block of the downscaled source image with all reference macro blocks of the downscaled reference image and to determine a best match among these matches as well as a corresponding preliminary motion vector.

The preliminary motion vectors of all source blocks of the downscaled source image are used to predict motion vectors in the full resolution images. The best matching reference macro block of the full resolution reference image is then searched only in a small search region determined by help of the preliminary motion vector. Therefore, the computation effort for the calculation of the motion vectors for the full resolution images can be reduced significantly.

The approach may be further improved by determining several preliminary motion vectors based on motion vectors of spatially or temporally adjacent macro blocks.

This approach may be iterated. That is, the downscaled images may be further downscaled, first level preliminary motion vectors may be determined by help of a full search in the further downscaled images and searching for second level preliminary motion vectors in the downscaled images may be limited to search areas determined by help of the first level preliminary motion vectors. Then, the second level preliminary motion vectors are used to predict motion vectors in the full resolution images.

Though being fast, hierarchical motion estimation requires large bandwidth. The bandwidth has to be even larger if the underlying storage medium carrying the reference image has a macro block aligned storage organization.

The macro block aligned storage organization has the advantage of direct and therefore fast access to reference macro blocks at regular positions. This advantage comes along with the drawback that macro blocks at positions other than the regular positions are not directly accessible. Reconstruction of a non-regularly positioned macro block requires retrieval of up to four regularly positioned macro blocks intersecting the non-regularly positioned macro block and composition of the non-regularly positioned macro block from sections of the regularly positioned macro blocks.

Thus, it is desirable to present an image stream generating method which is fast and requires less band width.

SUMMARY OF THE INVENTION

Therefore, the invention proposes a method and a device for generating an image data stream. The invention further proposes a method and a device for reconstructing a current image from an image data stream. The invention yet further proposes an image data stream and a storage medium carrying said proposed image data stream.

The method for generating an image data stream comprises the steps of (a) assigning search regions in a reference image to source macro blocks of a current image; (b) determining in the search regions best matches and corresponding residuals and (c) encoding the determined residuals in a data stream. A further feature of the method is related to the fact that the macro block processing order in at least one of the steps (b) and (c) depends on positions of said search regions in the reference image.

The variation in the processing order in best match determination allows for execution of best match searches in a search area assigned to two different source macro blocks in succession, so the search area assigned to the two search macro blocks need to be loaded only once.

The variation in the processing order during encoding enables the decoder to retrieve the intersecting part of the reference macro blocks only once without any necessity for re-order. Thus, more efficient determination of best matches is enabled and/or processing requirements at decoder side are reduced due to the order of encoding.

In an embodiment, the method further comprising the step of generating a low resolution image by down sampling the reference image or by merging pixels of the reference image; wherein step (a) comprises determining preliminary motion vectors by help of preliminary matches of the source macro blocks in said low resolution image and determining the search regions by help of the preliminary motion vectors.

This is an effective way of search region determination.

In a further embodiment, the processing order in step (b) depends on intersections of the search regions.

In yet a further embodiment, segmenting the reference image into a first segment and at least a second segment wherein source macro blocks with search regions and/or best matches comprised in the first segment are processed in step (b) and/or (c) prior to source macro blocks with search regions and/or best matches comprised in the at least a second segment.

In even a further embodiment, a first source macro block has the search region with the largest intersection with the search region of a second source macro block and the best match of a third source macro block is determined between determining the best match of the first source macro block and determining the best match of the second source macro block, if said third source macro block's search region is comprised in said largest intersection.

Subsequent processing of search region which intersect each other avoids retrieval of the intersection twice and thus accelerates processing.

In yet even a further embodiment, the reference image is stored in a macro block-wise accessible storage device and reconstructing an arbitrary search region requires retrieving a set of macro blocks from the storage device, a first set of macro blocks required for reconstructing a fourth source macro block's search region has the largest number of macro blocks in common with a second set of macro blocks required for reconstructing the search region of a fifth source macro block and the best match of a sixth source macro block is determined between determining the best match of the fourth source macro block and determining the best match of the fifth source macro block, if said sixth source macro block's best match is reconstructible from said macro blocks in common.

In another embodiment, a seventh source macro block's best match has the largest intersection with the best match of a eighth source macro block and the residual of a ninth source macro block is encoded between encoding of the residual of the seventh source macro block and encoding of the residual of the eighth source macro block, if said ninth source macro block's best match is comprised in said largest intersection.

In yet another embodiment, the reference image is stored in a macro block-wise accessible storage device and reconstructing an arbitrary macro block requires retrieving a further set of up to four macro blocks from the storage device, a first further set required for reconstructing a tenth source macro block' best match has the most macro blocks in common with a second further set required for reconstructing the best match of a eleventh source macro block and the residual of a twelfth source macro block is encoded between encoding of the residual of the tenth source macro block and encoding of the residual of the eleventh source macro block, if said twelfth source macro block's best match is reconstructible from said macro blocks in common.

In yet even another embodiment, information of the position of the source macro block and/or information of the position of the best match is encoded together with the residual.

BRIEF DESCRIPTION OF THE DRAWINGS

Exemplary embodiments of the invention are illustrated in the drawings and are explained in more detail in the following description.

In the figures.

DETAILED DESCRIPTION OF PREFERRED EMBODIMENTS

Hierarchical motion estimation will first be explained by help of FIG. 1.

Figure 1:
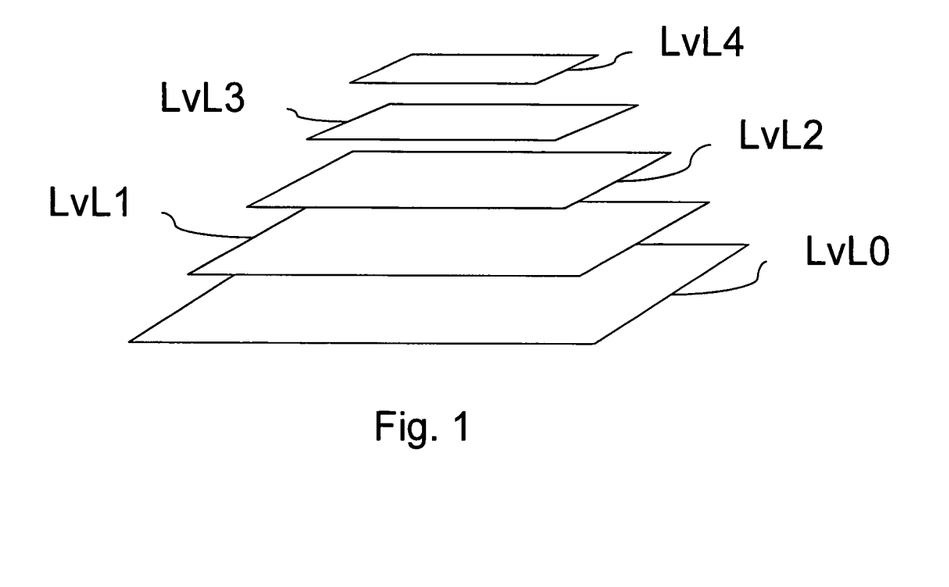
FIG. 1 depicts an exemplary pyramid of downscaled images.

In a first step, a pyramid of downscaled source images and reference images is built as exemplarily depicted in FIG. 1. For instance, a scaling factor of 2 is applied and results in a pyramid of image levels from full resolution level 0 to lowest resolution level n. In the depicted example, level 0 has a resolution of 720×576 pel and n equals 4:

Level LvL0 (full resolution): 720×576 pel
Level LvL1: 360×288 pel
Level LvL2: 180×144 pel
Level LvL3: 90×72 pel
Level LvL4: 45×36 pel During the next step, motion estimation is performed for the highest level LvL4 of the source pyramid. Because this level LvL4 consists only of a few macro blocks, it is not very computation intensive to calculate matches of each source blocks with all reference blocks and to determine the best match among the matches as well as a corresponding motion vector. That is, as search area the entire highest level of the reference pyramid is used.

The resulting motion vectors from the highest level n are used to predict motion vectors for the level n−1. Then, the search for the motion vectors for level n−1 can be restricted to search areas surrounding the locations indicated by the motion vectors from the highest level n. It is also possible, to further take highest level motion vectors from spatially adjacent macro blocks into account when predictions of motion vectors for the level n−1. Additionally or alternatively, motion vectors determined for the macro blocks of an immediately preceding image may be taken into account. Among the motion vectors predicted from the highest level and/or the preceding image, the one with the lowest distortion is chosen. Or, a larger search area comprising some or all locations indicated by the motion vector predictions is formed.

This approach is iterated several times until full resolution level LvL0 (full resolution) is reached.

If more than one motion vector prediction is used, at least two processing steps for each source macro block within each level are required in order to find the best matching motion vector:

In a first step, a set of Predictor Try commands is computed, each of the Predictor Try commands corresponding one motion vector prediction. When executing a Predictor Try command, the distortion function for a source macro block is computed for just one search macro block of the reference image wherein the search macro block is determined by the corresponding motion vector prediction.

Then, the set of Predictor Try commands is executed and a best matching motion vector prediction yielding minimum distortion is determined.

In a second step, around the best matching motion vector prediction, a set of Full Search commands is computed, each of the Full Search commands corresponding one search macro block position within a small search area surrounding the best matching motion vector prediction.

Then, the set of Full Search commands is executed and a best matching motion vector yielding minimum distortion for the current level is determined.

This algorithm requires an enormous bandwidth for the reference memory where the reference pyramid is stored. Assuming an average of 8 Predictor Try commands is required for each source macro block at level 0 (original resolution). For a HD format of 1920×1080 pixel at a frame rate of 25 Hz, this results in a minimum bandwidth of 1980*1080*8*25 Byte=428 MByte/s for loading of the reference data. It should be noted, that this is an ideal case where it is possible to access exactly the reference search macro block independent from its position in the reference image and location in the memory. Given a macro block aligned storage organization of the reference data, retrieval of arbitrarily positioned reference macro blocks will lead to a much higher required bandwidth. Macro block aligned storage organization means allows for fast accessing of aligned reference macro blocks in their entirety (i.e. with a burst of consecutive memory accesses with increasing addresses), but it is difficult to access a non-aligned reference search macro block which may be located anywhere in the image and does not fit in the macro block aligned structure.

Figure 2:
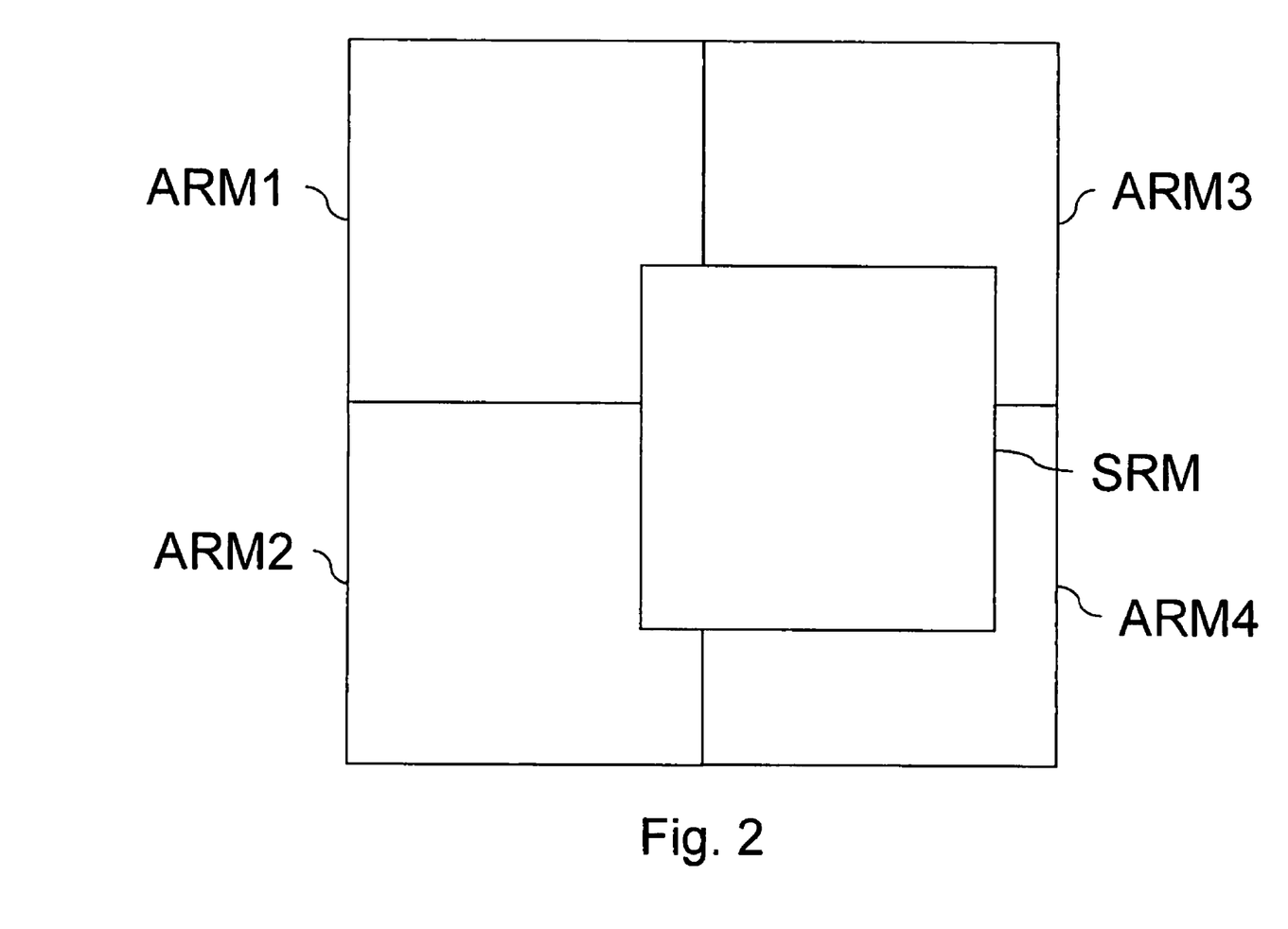
FIG. 2 depicts exemplarily the position of a selected reference macro block with respect to reference macro blocks directly retrievable from a storage with macro block aligned storage organization.

Assuming such a macro block aligned organization for the reference data, FIG. 2 shows that for retrieving a selected macro block SRM most likely 4 neighboured and aligned reference macro blocks ARM1, ARM2, ARM3, ARM4 have to be loaded from the memory in order to built the non-aligned reference search macro block SRM. This results in a required peak memory bandwidth of 1.7 GBytes/s for a single reference frame. If several reference frames shall be included in the search, the bandwidth requirements grow accordingly. This means that i.e. for 3 reference frames 5.1 GBytes/s are required for performing just the Predictor Try command set of a Hierarchical Motion Estimation.

The realization of such a bandwidth with external memories is very difficult. Therefore, Hierarchical Motion Estimators are built with large on-chip memories providing the required bandwidth. However, because complete reference frames have to be stored, the die size of these on-chip memories is significant.

Figure 3:
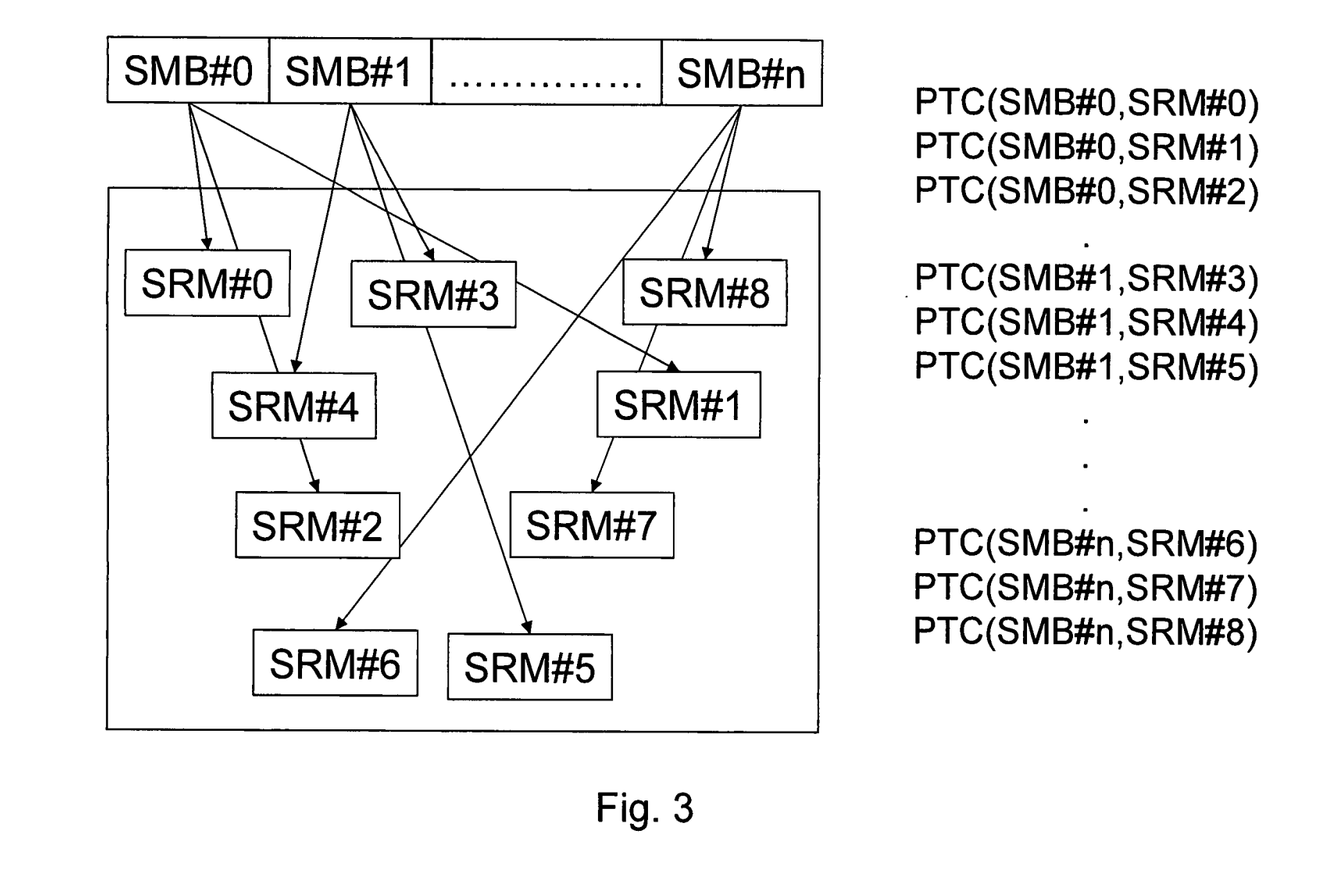
FIG. 3 exemplarily shows a set of source macro blocks and some reference macro blocks as well as an exemplary single list of Predictor Try commands.

In the prior art, the Predictor Try commands are executed in the order of the source macro blocks they belonging to. That means, first all Predictor Tries PTC( ) for source macro block SMB#0 are computed, than all for source macro block SMB#1 and so on. This is depicted in FIG. 3.

The invention proposes re-ordering of the Predictor Try command sequence dependent on the reference search macro block they are pointing at.

Figure 4:
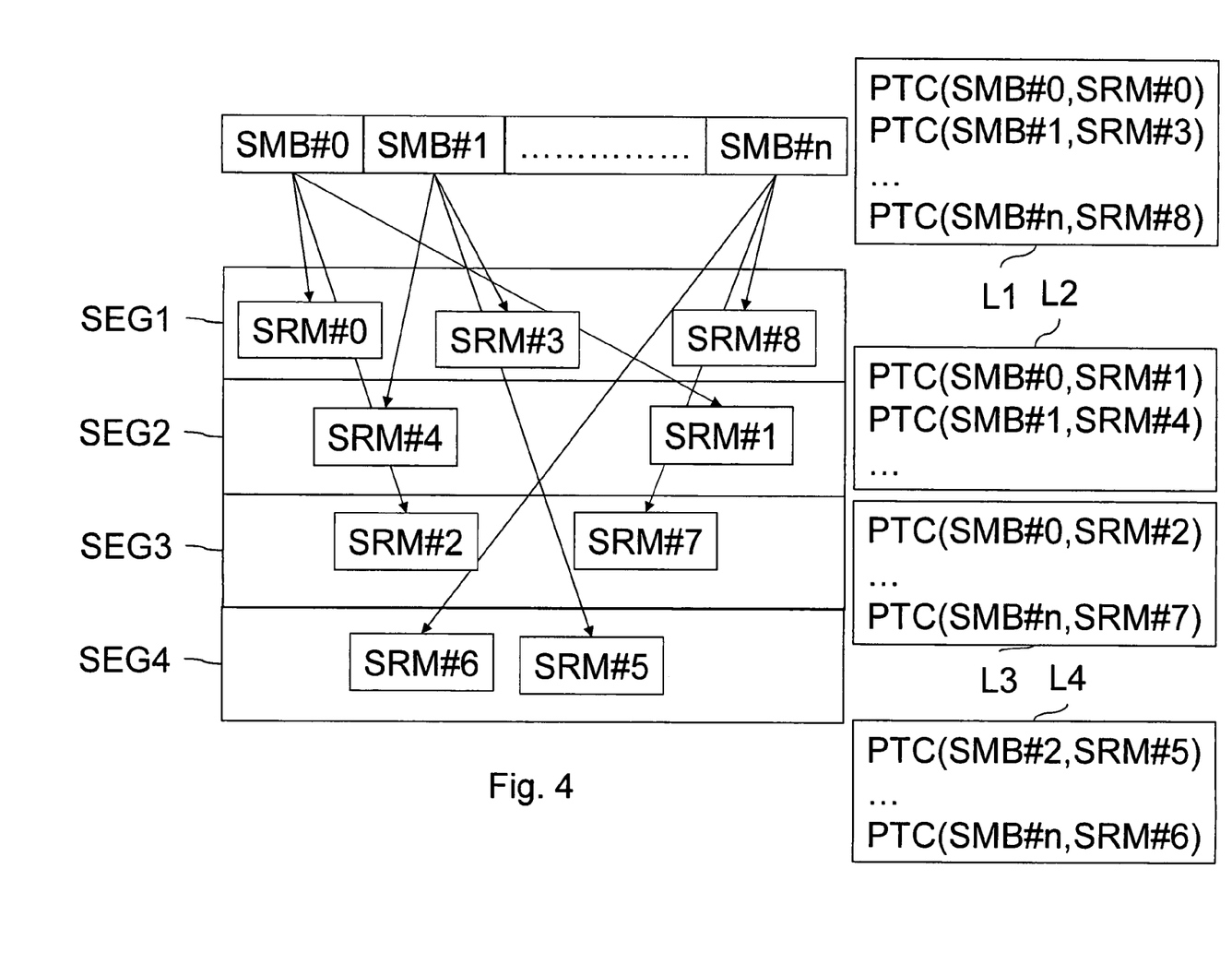
FIG. 4 exemplarily depicts a set of source macro blocks and some reference macro blocks as well as another exemplary set of lists of Predictor Try commands.

To do so, the reference picture is divided into k segments as exemplarily depicted for k=4 in FIG. 4. Then, the Predictor Try commands PTC( ) are re-ordered into k lists L1, L2, L3, L4 such that pointing to a reference search macro block SRM located in a certain segment SEG1, SEG2, SEG3, SEG4 are sorted into one list. In order to avoid that a Predictor Try PTC(SMB#m, SRM#L) points to a reference search macro block SRM located in two of the segments SEG1, SEG2, SEG3, SEG4, an overlap of the segments is required as exemplarily depicted in FIG. 5. Without vertical overlapping segments reference search macro blocks located at the border of a segment SEG1 may be partly located also in a vertically adjacent segment SEG2. By help of an exemplary vertical segment overlap of the vertical size of the reference search macro block, each reference search macro block is located completely within at least one segment SEG1', SEG2'.

Figure 6:
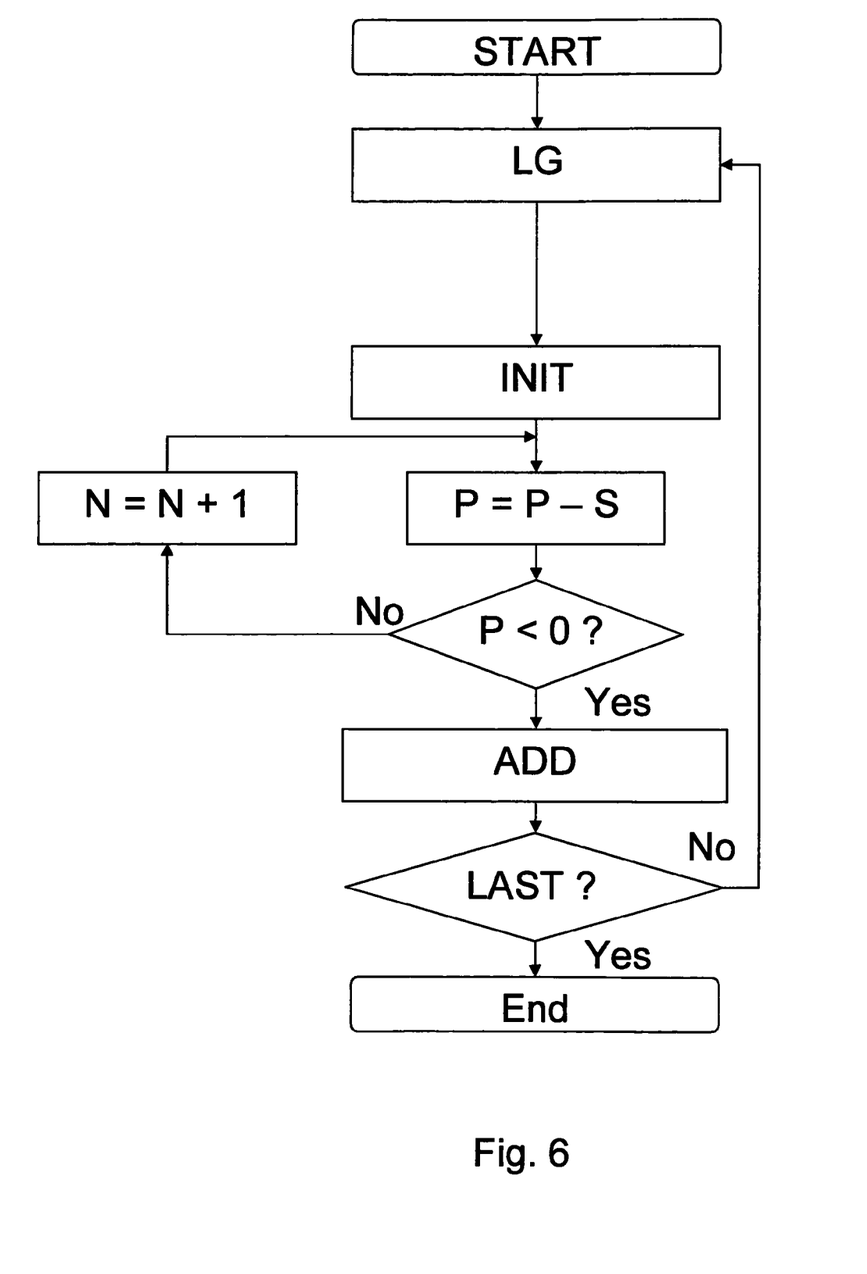
FIG. 6 depicts a flow chart of an exemplary embodiment of the reordering of Predictor Try Commands.

A flowgraph of an exemplary embodiment of the sorting algorithm for the Predictor Try commands is exemplarily shown in FIG. 6. The figure depicts, that sorting of the commands is a very simple and fast process.

In a step START, a set of k List L1, L2, L3, L4 is initialized wherein k is the number of overlapping segments SEG1', SEG2' into which the image is portioned. In a next step LG, a Predictor Try Command PTC(SMB#m, SRM#1) for comparison of m-th source macro block SMB#m with 1-th selected reference macro block SRM#1 is generated or the already generated Predictor Try Command PTC(SMB#m, SRM#1) is loaded. Then, in Step INIT, counter variable N is set to Zero and position variable P is initialized to the position of the selected reference macro block SRM#1. Subseqently, P is diminished by the width S of a segment in a loop wherein the loop is left if P drops below zero due to the diminishing. If not, N is in creased by 1 and P is diminished by S again. After leaving the loop, Predictor Try Command PTC(SMB#m, SRM#1) is appended to list N. Then it is checked in step LAST whether there are further comparisons for which a Predictor Try Command PTC(SMB#m, SRM#1) can be loaded or generated. If so, the method returns to step LG. If not, sorting ends.

At the end of the sorting process, k lists of Predictor Try commands PTC(SMB#m, SRM#1) have been generated. For the processing of each list only one segment SEG1', SEG2' of the reference frames has to be stored into a local memory because the previous sorting step ensures that all Predictor Tries PTC( ) within this list require the same reference image segment SEG1', SEG2' to be processed. This reduces the on-chip memory requirements by a factor of k.

It should be noted that it is possible to load reference data segment k+1 during the processing of reference data segment k to the local memory. Thus, computing of list k+1 can be started immediately after computing of list k has been completed. This requires doubling of the on-chip memory size which can be well compensated by increasing the number of segments.

Figure 5:
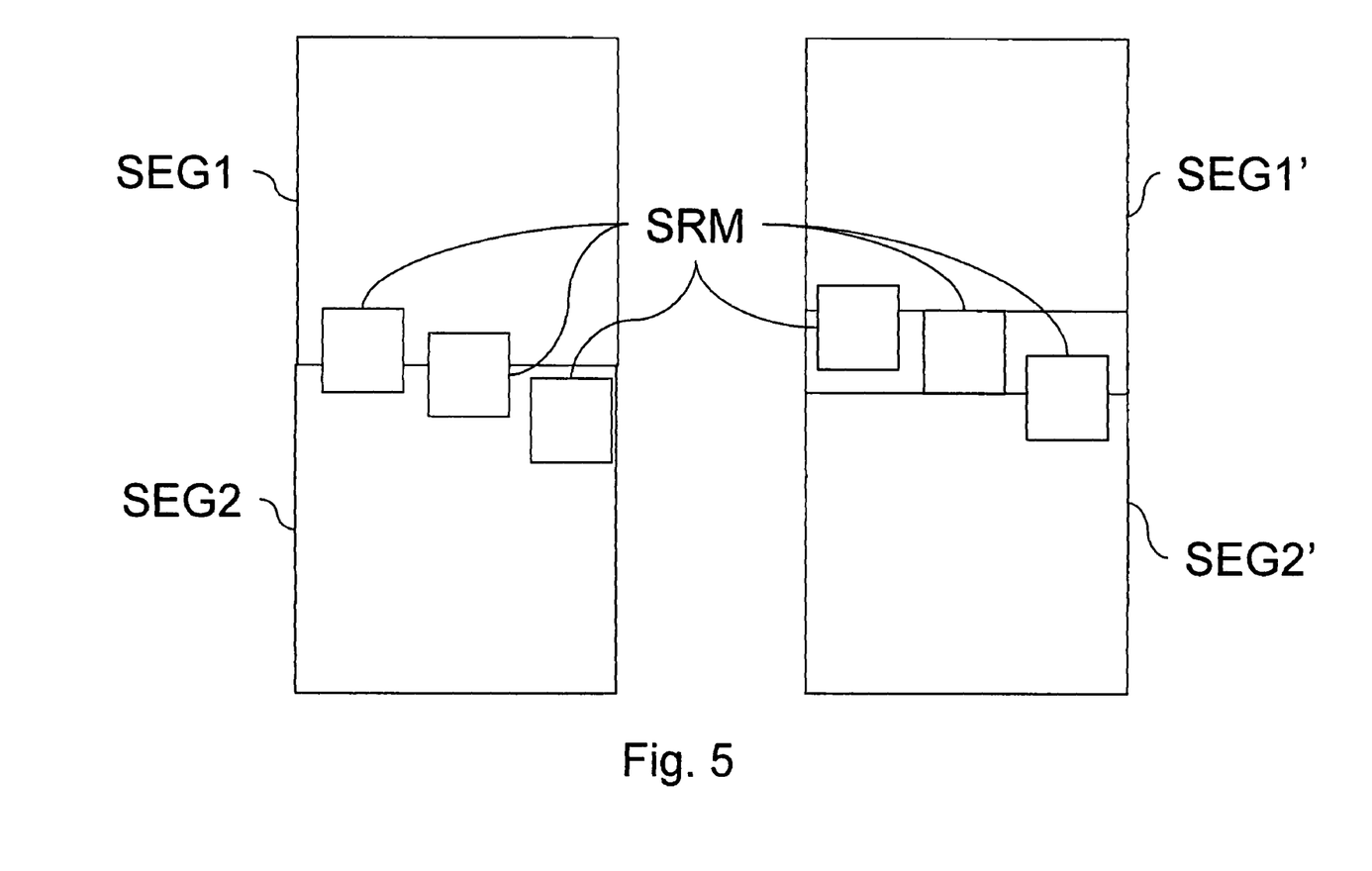
FIG. 5 exemplarily depicts the concept of overlapping segments.

Exactly the same idea to reduce the required memory bandwidth for loading the reference data can be applied for the second step of the Hierarchical Motion Estimation, which is a small Full Search around the best matching Predictor Try. Sorting the sequence of the Full Search commands with respect to the reference image segment they are pointing to enables a similar amount of on-chip memory reduction as sorting of the Predictor Try commands. For this approach the sequence of Full Search commands has to be sorted into k lists of commands, where each list contains Full Search commands pointing to the same reference data segment SEG1, SEG2, SEG3, SEG4. Then, the on-chip memory requirements are reduced in the order of factor k. Further more, if the segment size is chosen to be the same as for the processing of the Predictor Try commands, the same local memories may be used.

Finally, it should be noted that the above approach enables efficient parallel processing for Hierarchical Motion Estimation. Several lists L1, L2, L3, L4 of Predictor Try PTC (SMB#m, SRM#1) or Full Search commands may be distributed together with the corresponding reference data segments SEG1, SEG2 SEG3, SEG4 to several processing elements like the Synergistic Processing Elements of the Cell BE multiprocessor. Then, independent parallel processing of the Hierarchical Motion Estimation algorithm with a maximum of utilization of the processing elements can take place.

Commonly, the residuals of the source macro blocks are encoded together with the determined motion vectors in an image data stream according their position in the source image. Two residuals adjacent in the image data stream as known refer to two adjacent source macro blocks in the current image. As the motion vectors may point anywhere in the reference image in an unpredictable way, memory access to the reference macro blocks for motion compensation leads to the same bandwidth issue as described before for motion estimation.

So, the decoder may first receive all residuals and motion vectors related to the current image and sort the residuals and motion vectors into lists such that the residuals and motion vectors in each list are all related to the same segment SEG1, SEG2, SEG3, SEG4 of the reference image. Then during reconstruction of the macro blocks related to the residuals and motion vectors in one of the lists, only a segment SEG1, SEG2, SEG3, SEG4 of the reference image instead of he entire reference image has to be present in the local memory or cache which therefore may be small.

As the re-ordering in the decoder equals the re-ordering in the encoder, the re-ordering in the decoder can be made redundant by transmitting the residuals and motion vectors re-ordered. That is, even if no re-ordering is applied at encoder side for motion estimation, encoder's re-ordering for transmission which makes re-ordering at decoder side may be beneficial.

Therefore, invention proposes that residuals and corresponding motion vectors related to the same segment SEG1, SEG2, SEG3, SEG4 are encoded in separated contiguous sections of the image data stream. Then during decoding of each subsection, only a segment SEG1, SEG2, SEG3, SEG4 of the reference image instead of he entire reference image has to be present in the local memory or cache which therefore may be small. Similarly as for the encoder, the on-chip memory requirements and the bandwidth requirements to the external memory are reduced significantly through the re-ordering of the processing order.

As the position of a source macro block to which a residual belongs can no longer be deducted from the position of the residual in the image data stream, information regarding the position of the source macro blocks in the source image is comprised in the image data stream. This information may be formed by the relative position of a currently referred reference macro block with respect to a previously referred reference macro block. The position of a current source macro block can then be deducted by help of the motion vector. This minimizes the additional bandwidth required for transmitting the position information.

Then, the encoder mainly has to re-order the processing of the macro blocks for motion estimation in the proposed manner. This ensures that the motion vectors of subsequently processed macro blocks are pointing to the same reference area. If now the residuals are transmitted in exactly that order, no re-ordering step at the decoder is required. This proposal combines the advantages of low on-chip memory requirements and low bandwidth requirements at encoder and decoder with fast processing time for motion compensation at the decoder.

The invention claimed is:

1. A method for generating an image data stream, said method comprising:
   assigning search regions having different positions in a reference image to different source macro blocks of a current image;
   determining in the search regions best matches and corresponding residuals and
   encoding the determined residuals in a data stream wherein a processing order of the different source macro blocks in at least one of the determining in the search regions and encoding the determined residuals depends on the different positions of said search regions in said reference image.

2. The method according to claim 1, further comprising:
   generating a low resolution image by down sampling the reference image or by merging pixels of the reference image; wherein
   the assigning search regions comprises determining preliminary motion vectors by help of preliminary matches of the source macro blocks in said low resolution image and
   determining the search regions by help of the preliminary motion vectors.

3. The method according to claim 1, wherein:
   a processing order in the determining in the search regions depends on intersections of the search regions.

4. The method according to claim 1, further comprising:
   segmenting the reference image into a first segment and at least a second segment wherein:
   source macro blocks with search regions or best matches comprised in the first segment are processed in the determining in the search regions or encoding the determined residuals prior to source macro blocks with search regions or best matches comprised in the at least a second segment.

5. The method according to claim 1, wherein:
   information of the position of the source macro block or information of the position of the best match is comprised in the image data stream.

6. A device for generating an image data stream, said device comprises:
   means for assigning search regions having different positions in a reference image to different source macro blocks of a current image;
   means for determining in the search regions best matches and corresponding residuals and
   means for encoding the determined residuals in a data stream wherein
   the device comprises means for controlling the determining means or the encoding means such that a processing order during determination of best matches or during encoding of residuals differs from a processing order during assignment of search regions and depends on the different positions of said search regions in said reference image.

7. An image data stream comprising data related to source macro blocks of a current image, which source macro blocks are encoded by help of reference macro blocks in a reference image, said source macro block related data comprising references to positions of the source macro blocks in the current image and said source macro blocks related to data being arranged in an order depending on positions of the reference macro blocks in the reference image.

8. A method for reconstructing a current image from an image data stream, said method comprising:
   decoding position information and residuals from the image data stream said position information and said residuals being related to source macro blocks;
   retrieving reference macro blocks of a reference image by help of the position information and
   reconstructing source macro blocks by help of the residuals and of the reference macro blocks wherein either
   a processing order in at least one of the retrieving and reconstructing depends on positions of the reference macro blocks in the reference image.

9. A device for reconstructing a current image from an image data stream, said device comprising:
- means for decoding position information and residuals from the image data stream said position information and said residuals being related to source macro blocks;
- means for retrieving reference macro blocks of a reference image by help of the position information;
- means for reconstructing the source macro blocks by help of the residuals and of the reference macro blocks and
- means for controlling the retrieving means or the reconstructing means such that a processing order during retrieval or during reconstruction depends on positions of the reference macro blocks in the reference image.

10. A non-transitory computer readable storage medium carrying the image data stream according to claim 1.

* * * * *